United States Patent [19]

Sabado et al.

[11] Patent Number: 5,061,164
[45] Date of Patent: Oct. 29, 1991

[54] DOWEL-LESS MOLD CHASE FOR USE IN TRANSFER MOLDING

[75] Inventors: Gregorio T. Sabado; Morley J. Weyerman, both of Boise, Id.

[73] Assignee: Micron Technology, Inc., Boise, Id.

[21] Appl. No.: 678,487

[22] Filed: Apr. 1, 1991

[51] Int. Cl.⁵ .................... B29C 45/02; B29C 45/14; B29C 33/30

[52] U.S. Cl. .................... 425/116; 249/95; 264/272.170; 425/121; 425/183; 425/192 R; 425/195; 425/544; 425/588; 425/DIG. 228

[58] Field of Search .............. 425/116, 117, 183, 185, 425/186, 192 R, 195, 543, 544, DIG. 228, 121, 588; 264/272.11, 272.17; 249/95

[56] References Cited

U.S. PATENT DOCUMENTS

| | | | |
|---|---|---|---|
| 3,904,343 | 9/1975 | Scott, Jr. | 249/161 |
| 4,416,604 | 11/1983 | Bender et al. | 425/183 |
| 4,697,784 | 10/1987 | Schmid | 425/588 |
| 4,767,302 | 8/1988 | Okamoto et al. | 425/588 |
| 4,779,835 | 10/1988 | Fukushima et al. | 425/195 |
| 4,793,785 | 12/1988 | Osada | 425/116 |

FOREIGN PATENT DOCUMENTS 2-206509  8/1990  Japan .

Primary Examiner—Jay H. Woo
Assistant Examiner—Khanh P. Nguyen
Attorney, Agent, or Firm—Stanley N. Protigal

[57] ABSTRACT

Transfer molding equipment, used to encapsulate semiconductor die, is provided with clamps mounted to the mold base to position and align mold chases. Previous designs position and align the top and bottom mold chases using dowels on the mold base received in holes in the chases. The invention reduces the downtime of the mold equipment, and decreases the time required to replace the chases when a different package is to be produced.

10 Claims, 3 Drawing Sheets

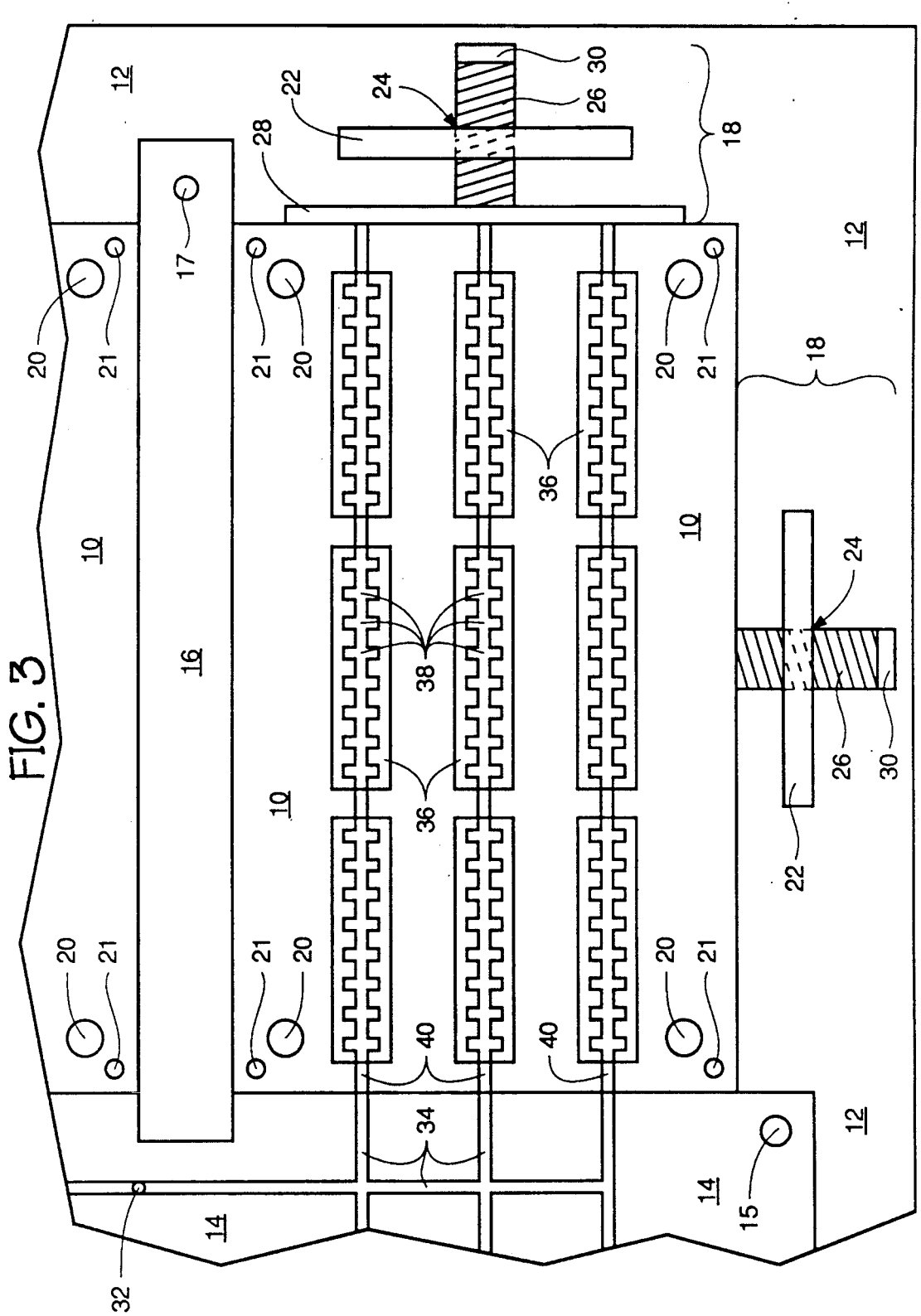

DOWEL-LESS MOLD CHASE FOR USE IN TRANSFER MOLDING

FIELD OF THE INVENTION

This invention relates to the field of semiconductor manufacturing. More specifically, it describes an improvement in the manner in which the top and bottom mold chases used to encapsulate the die in plastic are attached to the mold base, thereby making the equipment less likely to require servicing and making the chases easier to replace when a different package is to be produced.

BACKGROUND OF THE INVENTION

Many types of semiconductor devices are made in much the same way. A silicon wafer is masked, doped, and etched to produce a plurality of die on the wafer. Each die is separated then attached to a lead frame, with several die attached to each lead frame. The lead frame forms the input/output leads which will allow data to be transferred between the die and the electronic device into which the semiconductor components will be installed.

After the die are attached to the lead frame, the die are encapsulated in a protective layer of plastic material. The equipment which molds the plastic around the die comprises several parts. A bottom mold chase receives a bottom cavity bar, the cavity bar comprising a void which will be filled with plastic. A lead frame having die is placed on the bottom cavity bar, and a press holds a top cavity bar, which is received in a top chase, against the bottom cavity bar. The top and bottom cavity bars form a top and bottom void around the die. All this equipment together forms a mold base. Molten plastic is pumped into the top and bottom cavities to form the top and bottom halves of the package around the die. Each of the plastic packages formed on the lead frame are separated and the excess plastic is trimmed away from the lead frame. The plurality of bodies formed on each lead frame are separated, and the metal is trimmed and formed to produce the final semiconductor component.

The mold chases, which are rectangular in shape, have a hole jig ground in each corner. The jig grinding presently costs approximately $50 for each hole, adding $200 to the cost of each chase. Dowels on the mold base are received by the holes in the corners of the chases, the chases being aligned in this manner. After the dowels receive the chase, the chase is bolted to the mold base to hold it firmly in place. The mold base can receive several top and bottom chases at once, thereby increasing the productivity of the transfer molding equipment.

Semiconductor manufacturing facilities produce several package types. When a new type of package is to be produced the chases are removed and a different type of chase is installed on the dowels. Several different package types may be produced weekly.

Each time the chases are removed there is friction between the chases and the dowels. Since the dowels are made of a much softer material than the chases, metal is worn away from the dowels. Due to forces involved with removing and replacing chases, the dowel holes on the chases can wear and shift location or become damaged, thereby contributing to subsequent alignment problems. Over time the dowels become smaller in diameter and the chases are somewhat loose on the dowels, thereby producing incorrect alignment between the top and bottom chases. In addition, allowable tolerances in the placement of the holes in the corners of the chases can force the dowels further apart or closer together, thereby wearing the dowels even faster and causing the base of a dowel to become loose. The loose dowels cause misalignment of the top and bottom chases. This misalignment eventually makes the semiconductors produced with the worn dowels unusable, and the dowels must be replaced at no small cost.

Another drawback with the dowel arrangement is that it makes replacing the top and bottom mold chases time consuming. Each chase must be removed from the dowels on the mold base, and different chases installed which takes a skilled operator approximately 20 minutes of downtime.

SUMMARY OF THE INVENTION

An object of the invention is to provide transfer molding equipment which will eliminate the use of dowels to position the mold chases, thereby replacing one unreliable component with a more reliable component. A second object of the invention is to provide transfer molding equipment which allows a reduction in the time required to replace the mold chases. Another object of the invention is to provide transfer molding equipment which provides a means for easily aligning the upper and lower mold chases thereby eliminating package-to-leadframe misalignment and package mismatch due to chase misalignment. A fourth object of the invention is to provide transfer molding equipment which has the advantages listed above while allowing the conversion of equipment of previous designs to the inventive means.

These objects of the present invention are attained by using a system of clamps and fixed alignment blocks to align the chases rather than by using dowels. The alignment blocks and clamps therefore replace the dowels on the mold base and the holes in the mold chases, thereby lessening the downtime of the molding equipment. The alignment blocks and fixed portions of the clamps are permanently bolted to the mold base.

By using two alignment blocks and two clamps for each chase, the chases can be aligned in the x and y directions to within 0.0002". Dimensional errors which contribute to misalignment top to bottom can be easily adjusted by the use of shims placed between the alignment block and the chase.

The inventive design additionally provides the advantage of allowing chase replacement in approximately five minutes, rather than the 20 minutes normally required. Two or more molds can use a common alignment block, thereby simplifying the design of the invention as described in the detailed description of the preferred embodiment.

BRIEF DESCRIPTION OF THE DRAWINGS

FIG. 3 shows a detailed top view of one bottom chase of the embodiment of FIG. 1.

DETAILED DESCRIPTION OF THE PREFERRED EMBODIMENT

Figure 1:
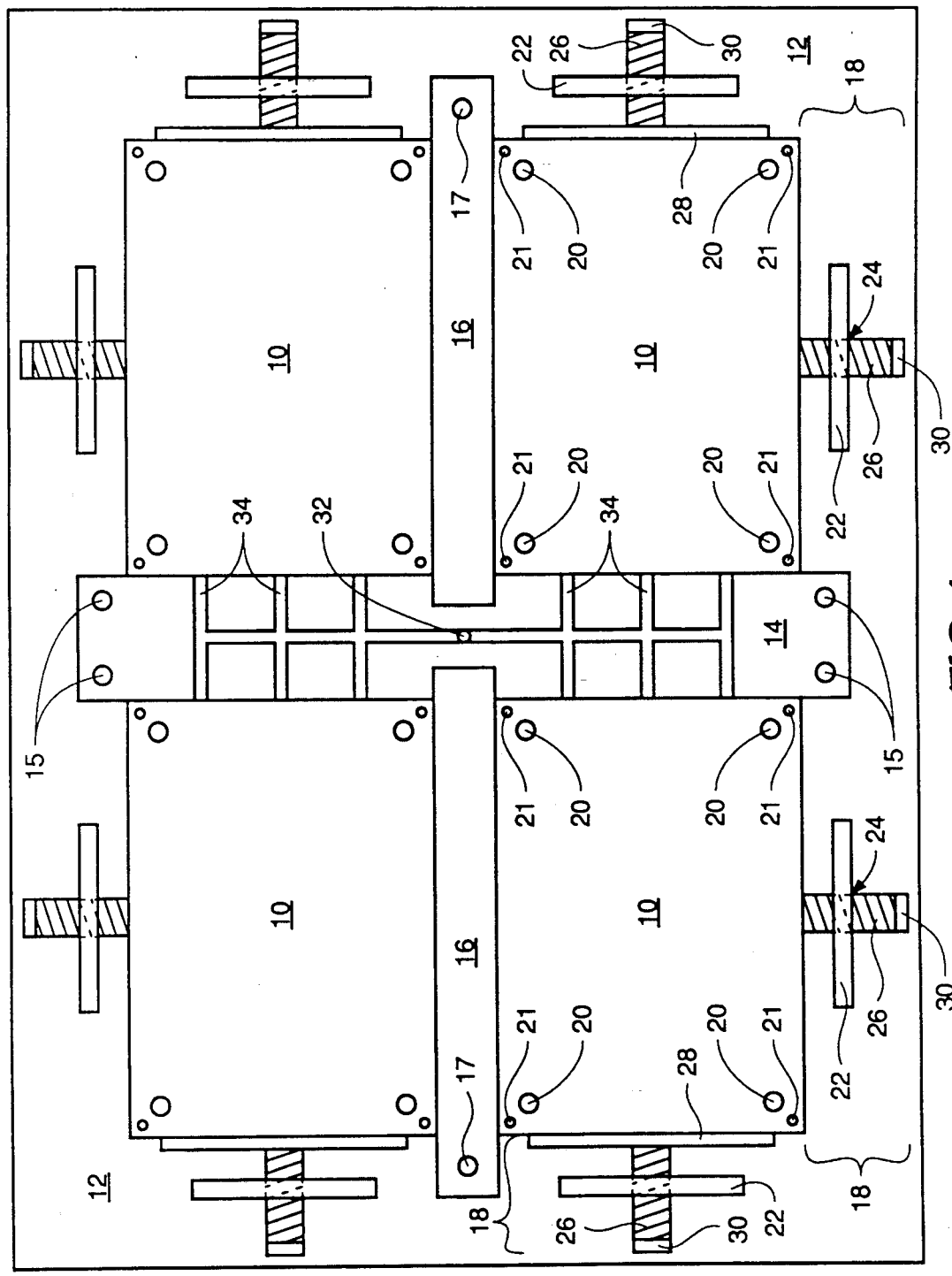
FIG. 1 shows a top view of the bottom chases of one embodiment of the invention having four bottom mold chases and four top mold chases.
Figure 2:
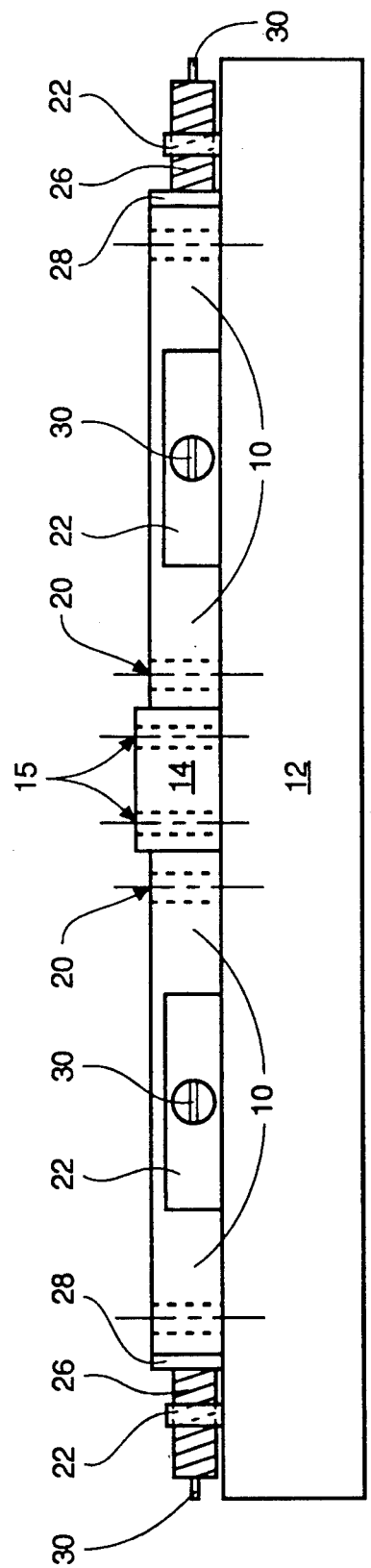
FIG. 2 shows a side view of the bottom chases of the embodiment of FIG. 1.

FIG. 1 is a top view, and FIG. 2 is a side view, of one embodiment of the invention showing four bottom mold chases 10 mounted to a mold base 12. A center block 14, permanently attached to the mold base 12 by attachment means 15 such as bolts or dowels, contacts all four mold chases 10. Two other fixed alignment blocks 16, which run laterally down the center of the mold base 12, contact two chases each. The fixed alignment blocks 16 are permanently attached on one end to the mold base 12 with attachment means 17 such as dowels or bolts, and are held in position on the opposite end by the center block 14. Eight clamps 18 are shown with two clamps 18 for each chase 10. Figure 1 shows the dowel holes 20 on the chases 10, but the dowel holes 20 are not used with the invention. This illustrates the use of chases designed for a mold base of a previous design on the inventive mold base 10. Bolts 21 hold the chases 10 to the mold base 12.

Each clamp assembly 18 has a fixed portion 22 bolted to the mold base 12. Through the fixed portion 22 of each clamp assembly 18 is a threaded hole 24 which receives a threaded shaft 26. On one of the two shafts 26 which positions a chase 10 is a planar end cap 28 which contacts a large portion of the end of the chase 10. This end cap 28 serves to dam the end of the channel (not shown) on the chases 10 to prevent plastic from flowing out the end of the chase 10. With this embodiment, the clamp assemblies 18 which contact the side of the mold chases 10 do not have end caps. On the end 30 of the shaft 26 opposite the end cap 28 is means for rotating the shaft 26, many such means being known by one skilled in the art. A preferred method is a recess in the end of the shaft which receives an Allen wrench. Rotating the shaft 26 moves the shaft 26 toward o away from the alignment block 14, 16 opposite the shaft 26 which should provide just enough force to hold the chase 10 into place. The primary function of the clamp assembly 18 is to align the chase 10 by contacting the chase 10 with the alignment blocks 14, 16. After the clamps 18 align the chases 10, bolts 21 in the four corners of the chases 10 hold the chases 10 in place on the mold base 12.

There are two clamp assemblies 18 for each chase 10 as shown, mounted to the mold base 12 at 90° angles to each other. The two clamps 18 position the chase 10 and hold it in place until the chase 10 is bolted 21 to the mold base 12. If care is taken to position the clamps 18 and alignment blocks 14, 16 of the bottom half of the mold base 12 with the clamps and alignment blocks of the top half of the mold base, the top and bottom chases will properly align. If the chases wear from contact with the end caps 28, shafts 26, or alignment blocks 14, 16, shims can easily be used to ensure alignment of the top and bottom chases.

A hole 32 and channels 34 are for channeling molten plastic, and are detailed in the description of FIG. 3.

FIG. 3 details of one chase 10 of the Figure embodiment. A lead frame with semiconductor die (not shown) is placed onto each of the bottom cavity bars 36. Each die on the lead frame (not shown) fits into a bottom cavity 38 formed in the bottom cavity bar. A top chase (not shown) is pressed onto the bottom chase and held firmly against it. The top assembly also has cavity bars with cavities that match the bottom cavities 38. Channels 34 on the center block 14 lead to channels 40 on the chase 10. In order to protect the die from the injected plastic, a layer of polyimide or other plastic is applied to the die prior to the molding procedures.

Molten plastic is pumped under pressure through the channels (no shown) running laterally through the center of the center block 14. The plastic comes to the surface of the center block 14 through a hole 32 in the center of the center block 14. The plastic runs through the channel 34 in the center block 14 to channels 40 in the chase 10. The plastic flows to the cavity bars 36 and fills cavities 38 in the cavity bar 36 and flows around the die (not shown) and portions of the lead frame (not shown) to encapsulate the semiconductor die on the lead frames. The end cap 28 on the clamp 18 dams the plastic and prevents it from running out the end of the chase. Therefore, there are end caps 28 only on the clamps 18 which are at the end of the chase 10, while there is no end cap on the clamp which contacts the side of the chase. After the plastic has cooled and solidified, the upper and lower chases are separated, and the lead frames are trimmed and formed, thereby providing a packaged semiconductor die.

What has been described is a specific configuration of the invention, as applied to a particular embodiment. Clearly, variations can be made to the original design described in this document for adapting the invention to other embodiments. For example, the invention can easily be modified by one of ordinary skill in the art to operate in top gating molds. Also, other clamp elements and other types of clamps can be adapted for use with the invention. Therefore, the invention should be read as limited only by the appended claims.

We claim:

1. A molding apparatus for forming a molten viscous material into a predetermined shape, comprising:
   a) first and second mold chases having a shaped void to receive said molten material;
   b) a base to receive said first mold chase, said mold base comprising a first pair of clamps positioned perpendicular to each other and said base further comprising a first pair of fixed alignment bars opposite said first pair of clamps, wherein said first pair of clamps hold said first mold chase against said first pair of fixed alignment bars, said first mold chase being aligned with said base thereby;
   c) a press having a movable portion, said press receiving said second mold chase, said press comprising a second pair of clamps positioned perpendicular to each other and further comprising a second pair of fixed alignment bars opposite said second pair of clamps, wherein said second pair of clamps hold said second mold chase against said second pair of fixed alignment bars, said press holding said second mold chase in alignment contact with said first mold chase thereby.

2. The molding apparatus of claim 1 further comprising cavity bars wherein said voids are formed by spaces defined by the shape of said cavity bars, at least one of said cavity bars received by each of said mold chases.

3. The molding apparatus of claim 1 wherein said press and said base each receive multiple mold chases and comprise two clamps for each chase.

4. The molding apparatus of claim 1 wherein each of said clamps further comprises an end cap which dams said molten material.

5. The molding apparatus of claim 1 wherein a semiconductor die is received by said shaped void.

6. A molding apparatus for encapsulating electronic devices in a molten viscous material, comprising:
   a) first and second mold chases having a shaped void to receive said molten material;
   b) a base to receive said first mold chase, said mold base comprising a first pair of clamps positioned perpendicular to each other and said base further comprising a first pair of fixed alignment bars opposite said first pair of clamps, wherein said first pair of clamps hold said first mold chase against said first pair of fixed alignment bars, said first mold chase being aligned with said base thereby;
   c) a press having a movable portion, said press receiving said second mod chase, said press comprising a second pair of clamps positioned perpendicular to each other and further comprising a second pair of fixed alignment bars opposite said second pair of clamps, wherein said second pair of clamps hold said second mold chase against said second pair of fixed alignment bars, said press holding said second mold chase in aligned contact with said first mold chase thereby.

7. The molding apparatus of claim 6 further comprising cavity bars wherein said voids are formed by spaces defined by the shape of said cavity bars, at least one of said cavity bars received by each of said mold chases.

8. The molding apparatus of claim 6 wherein said press and said base each receive multiple mold chases and comprise two clamps for each chase.

9. The molding apparatus of claim 6 wherein each of said clamps further comprises an end cap which dams said molten material.

10. The molding apparatus of claim 6 wherein a semiconductor die is received by said shaped void.

* * * * *

UNITED STATES PATENT AND TRADEMARK OFFICE
CERTIFICATE OF CORRECTION

PATENT NO. : 5,061,164
DATED : October 29, 1991
INVENTOR(S) : G. Sabado et al.

It is certified that error appears in the above-indentified patent and that said Letters Patent is hereby corrected as shown below:

Column 3, line 37, delete "o" and insert -- or --.

Column 4, line 5, delete "(no shown)" and insert -- (not shown) --.

Signed and Sealed this

Eighth Day of February, 1994

Attest:

BRUCE LEHMAN

Attesting Officer

Commissioner of Patents and Trademarks